United States Patent [19]

Barnett

[11] Patent Number: 4,544,565
[45] Date of Patent: Oct. 1, 1985

[54] FOODSTUFFS CONTAINING SWEETNESS INHIBITING AGENTS

[75] Inventor: Ronald E. Barnett, Suffern, N.Y.

[73] Assignee: General Foods Corporation, White Plains, N.Y.

[21] Appl. No.: 594,600

[22] Filed: Mar. 29, 1984

[51] Int. Cl.$^4$ .................. A23L 2/26; A23L 1/236; A61K 9/68; A61K 7/16
[52] U.S. Cl. .................. 426/538; 426/548; 426/658; 424/48; 424/49; 562/459; 562/463
[58] Field of Search .................. 426/658, 538, 548; 562/459, 463; 424/48, 49

[56] References Cited

U.S. PATENT DOCUMENTS 4,277,464 7/1981 Reussner et al. .................. 424/177
4,332,824 6/1982 Kahn et al. .................. 426/330.3

OTHER PUBLICATIONS

C. R. Acad. Sc. Paris, T. 283, (Oct. 27, 1976), "Therapeutic Chemistry—Anorectic Activity of Acids or Arylcycloalkylketones on Rats", Oralesi, H. et al.
Eur. J. Med. Chem-Chimica Therapeutica, May-Jun. 1978, "Anorectic Activity of Acids of Arylalkylketones and Arylcycloalkylketones", Oralesi, H. et. al.

Primary Examiner—Robert Yoncoskie
Assistant Examiner—Elizabeth C. Weimar

Attorney, Agent, or Firm—Joseph T. Harcarik; Linn I. Grim; Daniel J. Donovan

[57] ABSTRACT

Foodstuffs containing sweetness inhibitors having the general formula:

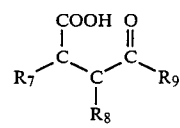

wherein $R_7$ is selected from the group consisting of hydrogen and $C_1$–$C_3$ alkyl, $R_8$ is selected from the group consisting of hydrogen and $C_1$–$C_3$ alkyl and wherein $R_9$ is the group

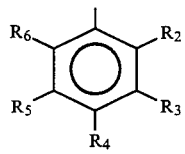

wherein $R_2$, $R_3$, $R_4$, $R_5$ and $R_6$ are independently selected from the group consisting of hydrogen, $C_1$–$C_3$ alkyl, $C_1$–$C_3$ alkoxy, $C_1$–$C_2$ hydroxyalkyl, hydroxy and COOH; and the non-toxic salts thereof.

14 Claims, No Drawings

FOODSTUFFS CONTAINING SWEETNESS INHIBITING AGENTS

BACKGROUND OF THE INVENTION

This invention relates generally to sweetness modification and more particularly to certain acids of arylalkylketones, particularly well suited as sweetness inhibitors in edible foodstuffs.

Sweetness is one of the primary taste cravings of both animals and humans. Thus, the utilization of sweetening agents in foods at order to satisfy this sensory desire is well established.

Naturally occurring carbohydrate sweeteners, such as sucrose, are still the most widely used sweetening agents. While these naturally occurring carbohydrates, i.e. sugars, generally fulfill the requirements of sweet taste, the abundant usage thereof does not occur without deleterious consequences, e.g. high caloric input, and nutritional imbalance.

The use of sweetening agents in foods to provide functions other than sweetening, such as to act as fillers, bulking agents, antimicrobial agents, freezing point depressants, stabilizers, etc. is also well established. Many times, however, the amount of sweetening agent employed for these alternate functions provides an excessively sweet taste, thereby requiring a modification of the formulation to reduce the sweetener level with a concurrent reduction in providing the alternate function to the food product. One solution of the art, with very limited success, was to add bitter or acidic ingredients to the food to reduce the sweetness perception; however, the resultant food then had an undesirable bitter or acidic taste.

Accordingly, in view of the aforementioned disadvantages associated with the use of sweetners, e.g., naturally occurring, artificial or combinations thereof, it becomes readily apparent that it would be highly desirable to provide a sweetness inhibiting agent which when added to foodstuffs can greatly reduce the level of deleterious sweetener normally required and concomitantly eliminate or greatly diminish the diadvantages associated with sweeteners. Moreover, it would be highly desirable to provide sweetness inhibiting agents which do not result in off-tastes, and which when added to foodstuufs reduce the level of sweetness perceived without concurrent reduction in the desirable properties of the foodstuff.

Arylalkylketones and arylcycloalkylketones, such as 3-(4'-methoxybenzoyl)propionic acid, are known in the prior art to possess anorectic and/or cholinergic activity in experimental animals such as rats, when introduced to the animals orally in feeds or injected via solutions thereof. See, for example, C. R. Acad. Sc. Paris, T. 283 (Oct. 27, 1976), "Therapeutic Chemistry—Anorectic Activity Of Acids Of Arylcycloalkylketones on Rats," by Oralesi, H. et al. and Eur. J. Med. Chem-Chimica Therapeutica, May–June 1978, "Anorectic Activity Of Acids Of Arylalkylketones and Arylcycloalkylketones," by Oralesi, H. et al. These papers, however, neither disclose nor remotely suggest the sweetness inhibiting properties of the compounds as described and utilized according to the present invention.

SUMMARY OF THE INVENTION

Accordingly, one object of the present invention is to provide sweetness inhibiting agents, which when added to foodstuffs, greatly reduce or eliminate unwanted or unpleasant sweet tastes, thus increasing the palatability of overly sweet products.

Another object of the present invention to provide foodstuff compositions containing a sweetness inhibiting agent.

A further object of this invention is to provide foodstuff compositions containing sweetness inhibiting agents which inhibit the sweetness perception of the foodstuff, without adding any off-tastes such as bitterness, acidity, etc. to the foodstuff.

A further object of this invention is to provide a process for inhibiting the sweetness perception of a foodstuff.

These and other objects are accomplished herein by providing food-acceptable sweetness modifying compounds, i.e. sweetness inhibitors, which when added to a foodstuff inhibit the sweet taste perceived from the foodstuff, the food acceptable sweetness inhibiting compounds having the general formula:

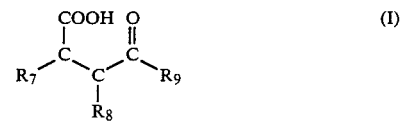

(I)

wherein $R_7$ is hydrogen or $C_1$-$C_3$ alkyl, $R_8$ is hydrogen or $C_1$-$C_3$ alkyl, wherein $R_9$ is

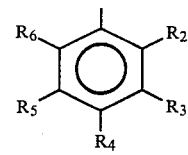

wherein $R_2$, $R_3$, $R_4$, $R_5$ and $R_6$ are independently selected from the group consisting of $C_1$-$C_3$ alkyl, $C_1$-$C_3$ alkoxy, $C_1$-$C_2$ hydroxyalkyl, hydrogen, hydroxy and COOH; and the non-toxic carboxylic acid salts and/or phenolic salts thereof.

DETAILED DESCRIPTION OF THE INVENTION

In accordance with the present invention, it has been surprisingly discovered that the sweet taste perceived in a food product can be inhibited by the addition to the food product of a compound within Formula I above.

Thus, according to the present invention, it has been found that the compounds within the scope of Formula I above are effective sweetness inhibitors when used in conjunction with any of a number of known natural and/or artificial sweeteners including, for example, sucrose, fructose, corn syrup solids, high fructose corn syrup, dextrose, xylitol, sorbitol, mannitol, acesulfam, thaumatin, invert sugar, saccharin, cyclamate, dihydrochalcone, hydrogenated glucose syrups, aspartame (L-aspartyl-L-phenylalanine methyl ester) and other dipeptides, glycyrrhizin, stevioside and the like.

Typical foodstuffs, including pharmaceutical preparations, in which the sweetness inhibitors of the present invention may be used are, for example, beverages, including soft drinks, carbonated beverages, ready to mix beverages and the like, infused foods (e.g. fruits or vegetables), sauces, condiments, salad dressings, juices, syrups, desserts, including puddings, gelatin, baked goods and frozen desserts, like ice creams and sherbets, icings and fillings, soft frozen products, such as soft frozen creams, soft frozen ice creams and yogurts, soft frozen toppings, such as dairy or non-dairy whipped topping, confections, toothpaste, mouthwashes, chewing gum, intermediate moisture foods (e.g. rice and dog foods) and the like.

Illustrative compounds with the scope of the above general formula (I) include 3-(3',4'-dimethylbenzoyl)-propionic acid, 3-(2',4'-dimethylbenzoyl)propionic acid, 3-(2'-methyl,4'-ethylbenzoyl)propionic acid, 3-(2',4',6'-trimethylbenzoyl)propionic acid, 3-(4'-carboxybenzoyl)propionic acid, 3-(4'-hydroxybenzoyl)propionic acid, 3-(3'-methyl,4'-hydroxybenzoyl)propionic acid, 3-(2',4'-dihydroxybenzoyl)propionic acid, 3-(2',4'-dihydroxy,6'-methylbenzoyl)propionic acid, 3-(3'-methyl,4'-methoxybenzoyl)propionic acid, 3-(3'-methyl-4'-ethoxybenzoyl)propionic acid, 3-(4'-methoxybenzoyl)propionic acid, 3-(4'-ethoxybenzoyl)propionic acid, 3-(3',4'-dimethoxybenzoyl)propionic acid and 3-(2',4'-dimethoxybenzoyl)propionic acid.

Particularly preferred compounds found to be active sweetness inhibitors within the scope of the present invention and encompassed by Formula I above include 3'(4'-methoxybenzoyl)propionic acid, 3-(2',4'-dimethoxybenzoyl)propionic acid, 3-(3',4'-dimethoxybenzoyl)propionic acid, 3-(4'-methoxybenzoyl)-2-methylpropionic acid, 3-(4'-methoxybenzoyl)-3-methylpropionic acid and 3-(4'-methoxybenzoyl)-2,3-dimethylpropionic acid.

3-(4'-methoxybenzoyl)propionic acid is particularly preferred herein. 3-(4'-methoxybenzoyl)propionic acid is commercially available from Aldrich Chemical Company. Other compounds within the scope of Formula I are also commercially available, known in the art, or can be prepared by standard Friedel-Crafts alkylation reactions. An excellent review can be found in "Friedel-Crafts and Related Reactions" Vol. II Part 1 and 2, G. A. Olah, Interscience Publishers (John Wiley and Sons, Inc.) New York, 1964. Other syntheses for these types of compounds are described in the afore-noted articles by Oralesi, H. et al.

As stated before, the non-toxic carboxylic acid and/or phenolic salts of the sweetness inhibiting compounds of Formula I above are also contemplated for use herein. Suitable salts include the sodium, potassium, ammonium, calcium or magnesium salts. Sodium salts are preferred.

In accordance with the present invention, a sweetness inhibitor is defined to be a compound which, when mixed with a sweetener, reduces or eliminates the perceived sweetness without substantially contributing a bitter, salty or sour taste of its own. Furthermore, it must be shown that any bitter, salty or sour taste is not sufficient to account for the substantial loss in sweetness perception.

Thus, one significant aspect of the present invention is that the inhibiting of the sweet taste of a food product by the sweetness inhibitors of the present invention is not due to the taste of the compound itself, but rather is due to an unexpected and highly surprising effect which results when the sweetness inhibitor is combined with a sweetener in the food product and tasted by the consumer.

Accordingly, what is readily apparent from the discovery herein is that the utilization of even very small quantities of the inhibiting compounds described herein can reduce or even eliminate the undesirable sweet and/or lingering after tastes of certain sweeteners in food products containing natural and/or artificial sweeteners, without affecting the other desirable tastes and properties of the food.

The versatility of the inhibitor compounds of the present invention in the formulation of food product is manifested in several manners. For example, the inhibitors can be added to an undesirably sweet product, for example, an overly sweet soft frozen product or infused vegetable product, to reduce or eliminate the undesirable sweet taste, but maintain the necessary soft frozen or infusion properties of the product. On the other hand, the inhibitors can be incorporated into products in conjunction with added amounts of sweetener in order to formulate novel soft frozen products.

In order to achieve the inhibiting results of the present invention, the sweetness inhibiting compounds described herein are generally added to the food product at a level which is effective to inhibit the sweetness perception of the food product. More particularly, it has been found that the results provided by the present invention occur when the inhibiting agent is added to the food product (containing a sweetener) in an amount in the range of from about 0.005 to about 2.0% by weight based on the weight of the consumed product. Greater amounts are operable but not practical. Preferred amounts are in the range of from about 0.01% to about 0.5% and most preferably from about 0.03% to about 0.5% by weight of the foodstuff.

The sweetener content of the foodstuffs in which the inhibitors of the present invention are utilized to inhibit sweetness, in general, may be in the range of from about threshold to about 50% sucrose equivalency.

It is understood that the afore-recited amounts are based on the consumed weight of the foodstuff. Thus, the amounts of inhibitor employed in a product, for example, a pre-mix, prior to taking its consumed form by the addition of diluents or solvent such as water, will necessarily vary accordingly in the pre-consumed form of the foodstuff. Moreover, it is further understood that the afore-recited amounts are based on the free acid form of the sweetness inhibiting compound. Thus, when salts are employed, the amount of the salt should be at least sufficient to provide to the afore-described amounts of the free acid.

Generally, the inhibiting effect provided by the present compounds is experienced over a wide pH range, e.g. 2 to 10, preferably 5 to 7.5 and in buffered or unbuffered formulations.

Depending upon the particular foodstuffs, the amounts and kind of sweetener contained therein and concomitant amount of inhibitor employed, reductions in perceived sweetness of from about 1% to about 100% in the foodstuff product are achieved. Generally, when the inhibitors of the present invention are employed in the afore-noted preferred amounts, reductions in perceived sweetness of from about 5% to about 50% or greater in the foodstuff product are observed.

In order that those skilled n the art may better understand how the present invention may be practiced, the following examples are given by way of illustration and not by way of limitation.

EXAMPLE 1

3-(4'-methoxybenzoyl)propionic acid was tested at six levels in aqueous pH 7 citrate buffer (3.5 g tripotassium citrate and 0.042 g. citric acid per liter) containing 15% sucrose. Sweetness was rated by matching with standard aqueous sucrose solutions prepared in pH 7 buffer.

| concentration % | sucrose match % |
|---|---|
| 0.00 | 15.0 |
| 0.02 | 13.5 |
| 0.05 | 10.8 |
| 0.10 | 8.2 |
| 0.20 | 4.8 |
| 0.30 | 2.5 |
| 0.50 | 0.0 |

EXAMPLE 2

3-(4'-methoxybenzoyl)propionic acid was tested at various levels in aqueous solutions adjusted to pH 7 containing either saccharin or aspartame. The results are shown below.

| concentration (%) inhibitor | Sweetener (conc.) | Mean Sweetness rating |
|---|---|---|
| 0 | saccharin (0.05%) | 4 |
| 0.5 | saccharin (0.05%) | 1.3 |
| 0 | aspartame (0.05%) | 3.1 |
| 0.5 | aspartame (0.05%) | 0.5 |

Mean sweetness rating was determined on a scale ranging from 0 to 6. A rating of 6 is extremely sweet and a rating of 0 is not sweet.

EXAMPLE 3

3-(4'-methoxybenzoyl)propionic acid was tested at four levels in aqueous solutions, adjusted to pH 7, containing 40% sucrose. The results were as follows:

| Concentration % | Mean Sweetness rating |
|---|---|
| 0.00 | 5.46 |
| 0.25 | 2.69 |
| 0.50 | 2.31 |
| 1.00 | 1.92 |
| 2.00 | 0.85 |

Mean sweetness rating was determined on a scale ranging from 0 to 6. A rating of 6 is extremely sweet and a rating of 0 is not sweet.

EXAMPLE 4

The following compounds were each tested at a level of 0.1% by weight in a 5% aqueous sucrose solution adjusted to a pH of 7:

3-(2',4'-dimethoxybenzoyl)propionic acid, 3-(3',4'-dimethoxybenzoyl)propionic acid, 3-(4'-methoxybenzoyl)-2-methylpropionic acid, 3-(4'-methoxybenzoyl)-3-methylpropionic acid and 3-(4'-methoxybenzoyl)-2,3-dimethylpropionic acid. These compounds were found to reduce the sweetness perception of a 5% sucrose solution from about 40 to about 90%.

EXAMPLE 5

A soft freeze pudding having a sweetness level of about 38% sucrose equivalents is prepared from the following ingredients:

| | Wt. (g)/1.5 liter | Percent |
|---|---|---|
| Pudding Emulsion (Part I) | | |
| Water | 475.8 | 31.75 |
| Tween 60 (Polysorbate 60) and Span 60 (Sorbitan monostearate) | 4.95 | 0.33 |
| Guar Gum | 1.05 | 0.07 |
| Sodium Caseinate (94% protein) | 12.9 | 0.86 |
| Sucrose | 220.8 | 14.73 |
| Butter (Hard, Sweet) | 79.5 | 5.30 |
| Coconut oil | 189.0 | 12.61 |
| K-Sorbate (Sorbitan K) | 0.45 | 0.03 |
| Dextrose | 9.9 | 0.66 |
| Vanallin (Ethyl) | 0.45 | 0.03 |
| Pudding Emulsion (Part II) | | |
| Dextrose | 497.1 | 33.17 |
| Sodium Alginate | 3.45 | 0.23 |
| Calcium Chloride dihydrate (10% solution) | 3.45 | 0.23 |
| | 1498.8 | 100.00% |

The pudding is prepared by conventional processes, such as disclosed in U.S. Pat. No. 4,146,652 incorporated herein by reference, by heating the water to about 140° F., adding all part I ingredients and heating to about 155°–160° F. with stirring. Part II ingredients (except the $CaCl_2$ solution) are then added to Part I and blended uniformly at temperature of about 130° F. The calcium chloride solution is then added, mixing well. The total sample is then homogenized in a Manton-Gaulin homogenizer at 500 PSI/7000 PSI. The homogenized sample is cooled in an ice bath to about 34°–38° F. and frozen overnight.

Various levels of the sodium salt of 3-(4'-methoxybenzoyl)propionic acid are incorporated into the freeze flow pudding as described above to evaluate its effectiveness as a sweetness inhibiting agent. The inhibitor compound is incorporated into the pudding formulation by adding the compound to Part II above and then preparing the pudding product as described.

| Percent (%) by weight sodium salt 3-(4'-methoxybenzoyl) propionic acid (based on free acid) | Percent (%) sweetness inhibition |
|---|---|
| 0 | 0 (control, pudding without inhibitor) |
| 0.0625 | 6–7 |
| 0.125 | 6–7 |
| 0.25 | 27 |
| 0.50 | 43 |

EXAMPLE 6

The following example demonstrates the use of the sodium salt of 3-(4'-methoxybenzoyl)propionic acid in the preparation of an acceptably sweet soft frozen whipped topping product.

| | Percent By Weight | | |
|---|---|---|---|
| Ingredient | Control | Soft Frozen | Soft Frozen |
| Water | 43.8 | 30.66 | 30.41 |
| Hydrogenated Oils | 25.4 | 17.79 | 17.79 |
| Sugar Syrups/Sugar | 28.3 | 49.83 | 49.83 |
| Sodium Caseinate | 1.5 | 1.05 | 1.05 |
| Natural and Artificial Flavors and Colors | 0.4 | 0.24 | 0.24 |
| Gums, Emulsifiers | 0.6 | 0.42 | 0.42 |
| 3-(4'-methoxybenzoyl) propionic acid (Na Salt) | — | — | 0.25 |

| Ingredient | Percent By Weight | | |
|---|---|---|---|
| | Control | Soft Frozen | Soft Frozen |
| | 100.0% | 100.0% | 100.0% |

The ingredients are blended together and formulated into a whipped or soft frozen whipped product employing conventional processes such as disclosed in U.S. Pat. No. 3,431,117 incorporated by reference herein. The soft frozen whipped product containing the inhibitor compound, while containing almost twice as much sweetener as the control (regular whipped topping), is found to have only as much sweetness perception as the regular whipped product. The soft frozen whipped product without the inhibitor is too sweet to be acceptable.

Thus, it is seen that the inhibitor compound of the present invention permits the development of a ready to use—soft frozen—whipped product from the freezer without excessive sweetness. The control topping is hard in the freezer and cannot be used directly.

EXAMPLE 7

The following example demonstrates the use of the sodium salt of 3-(4'-methoxybenzoyl)propionic acid in the preparation of an intermediate moisture rice product.

| | Percent By Weight | |
|---|---|---|
| Ingredient | Control | With Inhibitor Compound |
| Rice Solids | 66.66 | 66.66 |
| Glycerin | 5.36 | 5.36 |
| Salt (NaCl) | 1.91 | 1.91 |
| Potassium Sorbate | 0.44 | 0.44 |
| High Fructose Corn Syrup | 5.73 | 5.73 |
| Water | 19.90 | 19.68 |
| 3-(4'-methoxybenzoyl) propionic acid (Na Salt) | — | 0.22 |
| | 100.00% | 100.00% |

Each product is prepared by preparing a solution of glycerin, salt, potassium sorbate, high fructose corn syrup, water and the inhibitor compound (when used). The raw rice is then added and cooked n the solution until the rice is fully cooked and is infused with the other ingredients. The rice product is then dried to about 20% moisture in a forced air drier maintained at 300° F. When ready to serve, a ½ cup of the rice product is boiled in ½ cup of water and let stand for 5 minutes before fluffing.

The control rice product is found to have a mildly sweet taste (generally not desirable in a rice product) while the use of the inhibitor in the rice product eliminates the undesirable sweet taste. Thus, the inhibitor compound makes possible the development of a shelf stable, instantized rice with a significant improvement over conventional instant rice, while still maintaining convenience.

EXAMPLE 8

The following example demonstrates the preparation of an improved infused vegetable utilizing the sodium salt of 3-(4'-methoxybenzoyl)propionic acid.

| | Infused Celery Percent By Weight | |
|---|---|---|
| Ingredient | Control | With Inhibitor Compound |
| Fresh Celery ⅛-¼" pieces | 20.00 | 20.00 |
| Water | 54.69 | 54.59 |
| Corn Syrup Solids 42DE | 25.27 | 25.27 |
| Sodium meta bisulfite (Na$_2$SO$_3$) | 0.04 | 0.04 |
| 3-(4'-methoxybenzoyl) propionic acid (Na Salt) | — | 0.10 |
| | 100.00% | 100.00% |

The ingredients are mixed by preparing a solution of water, corn syrup solids, bisulfite and the inhibitor (when used) by heating to 150° F. The celery is added and infused for 1 hour. The celery can be stored frozen or dehydrated for shelf stability. The control is found to be too sweet, while the celery product containing the inhibitor compound has improved and acceptably reduced sweetness. Thus, the inhibitor permits the production of infused vegetables which are significantly better in texture than non-infused vegetables both in the frozen and dry state. The inhibitor reduces the sweet effect caused by the infusion ingredients.

Obviously, other modifications and variations of the present invention are possible in light of the above teachings. It is therefore to be understood that changes may be made in the particular embodiments of this invention which are within the full intended scope of the invention as defined by the appended claims.

I claim:

1. A foodstuff composition comprising a foodstuff, a sweetener and a sweetness inhibiting amount of a sweetness inhibiting compound having the general formula:

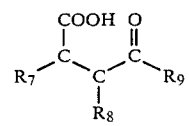

wherein $R_7$ is selected from the group consisting of hydrogen and $C_1$-$C_3$ alkyl, $R_8$ is selected from the group consisting of hydrogen and $C_1$-$C_3$ alkyl and wherein $R_9$ is the group

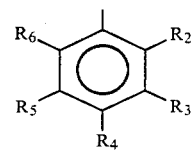

wherein $R_2$, $R_3$, $R_4$, $R_5$ and $R_6$ are independently selected from the group consisting of hydrogen, $C_1$-$C_3$ alkyl, $C_1$-$C_3$ alkoxy, $C_1$-$C_2$ hydroxyalkyl, hydroxy and COOH; and the non-toxic salts thereof.

2. The foodstuff composition of claim 1 wherein said sweetness inhibiting compound is present in a food-acceptable amount in the range of from about 0.005 to about 2.0% by weight of the foodstuff composition.

3. The foodstuff composition of claim 1 wherein said sweetness inhibiting compound is present in a food-acceptable amount in the range of from about 0.03 to about 0.5% by weight of the foodstuff composition.

4. The foodstuff composition of claim 1 wherein said sweetener is selected from the group consisting of sucrose, fructose, corn syrup solids, high fructose corn syrups, dextrose, xylitol, sorbitol, mannitol, acesulfam, thaumatin, invert sugar, saccharin, cyclamate, dihydrochalcone, hydrogenated glucose syrups, aspartame, stevioside, glycyrrhizin and mixtures thereof.

5. The foodstuff composition of claim 1 wherein $R_7$ and $R_8$ are each independently selected from the group consisting of hydrogen and $C_1$–$C_3$ alkyl and $R_2$, $R_3$, $R_4$ and $R_5$ are each independently selected from the group consisting of hydrogen and $C_1$–$C_3$ alkoxy.

6. The foodstuff composition of claim 1 wherein said sweetness inhibiting compound is selected from the group consisting of 3-(4'-methoxybenzoyl)propionic acid, 3-(2',4'-dimethoxybenzoyl)propionic acid, 3-(3',4'-dimethoxybenzoyl)propionic acid, 3-(4'-methoxybenzoyl)-2-methylpropionic acid, 3-(4'-methoxybenzoyl)-3-methylpropionic acid and 3-(4'-methoxybenzoyl)-2,3-dimethylpropionic acid.

7. The foodstuff composition of claim 1 wherein said sweetness inhibiting compound is 3-(4'-methoxybenzoyl)propionic acid.

8. The foodstuff composition of claim 1 wherein said foodstuff is selected from the group consisting of a soft frozen dessert, an infused vegetable, an instantized rice and a dairy or non-dairy whipped topping.

9. A process for inhibiting the sweetness perception of a foodstuff, said process comprising adding to a foodstuff containing a sweetener, a a sweetness inhibiting compound, said compound being present in an amount effective to inhibit the sweetness perception in said foodstuff and having the general formula:

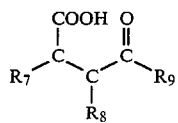

wherein $R_7$ is selected from the group consisting of hydrogen and $C_1$–$C_3$ alkyl, $R_8$ is selected from the group consisting of hydrogen and $C_1$–$C_3$ alkyl and wherein $R_9$ is the group

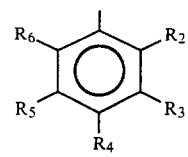

wherein $R_2$, $R_3$, $R_4$, $R_5$ and $R_6$ are independently selected from the group consisting of hydrogen, $C_1$–$C_3$ alkyl, $C_1$–$C_3$ alkoxy, $C_1$–$C_2$ hydroxyalkyl, hydroxy and COOH; and the non-toxic salts thereof.

10. The process of claim 9 wherein said sweetness inhibiting compound is present in a food-acceptable amount in the range of from about 0.005 to about 2.0% by weight of the foodstuff composition.

11. The process of claim 9 wherein said sweetener is selected from the group consisting of sucrose, fructose, corn syrup solids, high fructose corn syrups, dextrose, xylitol, sorbitol, mannitol, acesulfam, thaumatin, invert sugar, saccharin, cyclamate, dihydrochalcone, hydrogenated glucose syrups, aspartame, stevioside, glycyrrhizin and mixtures thereof.

12. The process of claim 9 wherein $R_7$ and $R_8$ are each independently selected from the group consisting of hydrogen and $C_1$–$C_3$ alkyl and $R_2$, $R_3$, $R_4$ and $R_5$ are each independently selected from the group consisting of hydrogen and $C_1$–$C_3$ alkoxy.

13. The process of claim 9 wherein said inhibiting agent is 3-(4'-methoxybenzoyl)propionic acid.

14. The process of claim 9 wherein said sweetness inhibiting compound is selected from the group consisting of 3-(4'-methoxybenzoyl)propionic acid, 3-(2',4'-dimethoxybenzoyl)propionic acid, 3-(3',4'-dimethoxybenzoyl)propionic acid, 3-(4'-methoxybenzoyl)-3-methylpropionic acid, 3-(4'-methoxybenzoyl)-2-methylpropionic acid and 3-(4'-methoxybenzoyl)-2,3-dimethylpropionic acid.

* * * * *